United States Patent [19]

Tal

[11] 4,057,173

[45] Nov. 8, 1977

[54] ELECTRICAL CONTROL SYSTEM FOR AUTOMATIC METERING VALVE

[76] Inventor: Aharon Tal, 131 Hanassi Street, Chof Yam, Herzlia, Israel

[21] Appl. No.: 674,284

[22] Filed: Apr. 6, 1976

[30] Foreign Application Priority Data

Apr. 8, 1975 Israel .................................. 47049

[51] Int. Cl.² .............................................. B67D 5/30
[52] U.S. Cl. ...................................... 222/20; 222/59; 222/70; 222/504
[58] Field of Search ................. 222/14, 16, 17, 20, 222/59, 70, 504

[56] References Cited

U.S. PATENT DOCUMENTS

| | | | |
|---|---|---|---|
| 3,028,050 | 4/1962 | Nelson | 222/16 |
| 3,252,623 | 5/1966 | Corbin et al. | 222/59 |
| 3,580,435 | 5/1971 | Bertillsson | 222/504 |
| 3,736,930 | 6/1973 | Georgi | 222/59 |
| 3,831,812 | 8/1974 | Dolan | 222/20 |

*Primary Examiner*—Robert B. Reeves
*Assistant Examiner*—Hadd Lane

*Attorney, Agent, or Firm*—Benjamin J. Barish

[57] ABSTRACT

An electrical control system for an automatic metering valve delivering a preset quantity of water and having a housing for the valve, a rotary impeller disposed within the housing and rotatable at a velocity in accordance with the rate of delivery of the water, and an automatic shut-off mechanism for turning-off the valve when the preset quantity of water has been delivered. The control system includes a sensible element disposed internally of the valve housing and rotated with the impeller, a sensor sensing the sensible element to produce electrical signals corresponding to the number of rotations thereof and of the impeller, a presettable counter circuit effective to count the latter electrical signals, a switching circuit effective to actuate the valve shut-off mechanism to turn-off the valve when the counter circuit reaches a preset number corresponding to the preset quantity of fluid to be delivered, and a presettable timer effective to actuate the valve shut-off mechanism to turn-on the valve after the elapse of a preset time interval.

11 Claims, 5 Drawing Figures

ELECTRICAL CONTROL SYSTEM FOR AUTOMATIC METERING VALVE

BACKGROUND OF THE INVENTION

The present invention relates to an electrical control system for an automatic metering valve, and particularly to a control system which actuates an automatic shut-off mechanism to turn-off the valve when a preset quantity of water or other fluid has been delivered.

The conventional automatic metering valve now in common use includes a rotary impeller which is rotatable in accordance with the rate of delivery of the water, the impeller driving a totalizer gearing mechanism which totalizes the quantity of water delivered and actuates a shut-off mechanism to turn-off the valve when a preset quantity has been delivered. These commonly used automatic metering valves are not entirely satisfactory for many reasons. For one, the totalizer gearing mechanism is quite bulky, which thereby increases the overall size of the metering valve. In addition, such valves are difficult to calibrate, and once calibrated, the calibration is difficult to maintain or to change for special circumstances or for other applications.

SUMMARY OF THE INVENTION

An object of the present invention is to provide an electrical control system for an automatic metering valve having advantages in the above respects.

Another object of the invention is to provide an electrical control system for automatic metering valves which conveniently enables other controls to be applied with respect to the valve, for example a timer control which automatically turns-on the valve after the elapse of a predetermined time interval.

The present invention provides an electrical control system for an automatic metering valve delivering a preset quantity of a fluid and including a housing for the valve, a rotary impeller disposed within the housing and rotatable at a velocity in accordance with the rate of delivery of the water, and an automatic shut-off mechanism for turning-off the valve when the preset quantity of water has been delivered. The control system of the present invention includes a sensible element disposed internally of the valve housing and rotated with the impeller; a sensor, preferably disposed externally of the housing, sensing the sensible element to produce electrical signals corresponding to the number of rotations thereof and of the impeller; a presettable counter circuit effective to count the electrical signals; and a switching circuit effective to actuate the valve shut-off mechanism to turn-off the valve when the counter circuit reaches a preset number corresponding to the present quantity of fluid to be delivered.

According to an important feature of the present invention, the control system further includes a presettable timer effective to actuate the valve shut-off mechanisms to turn-on the valve after the elapse of a preset time interval.

According to a still further feature, the presettable counter circuit includes a digital counter, a sensor output circuit for imcrementing the digital counter by the sensor electrical signals, a timer producing timing electrical signals, a timer output circuit for incrementing the digital counter by the timer electrical signals, a quantity presettable device for presetting the counter according to the predetermined quantity of fluid to be delivered, a timer presettable device for presetting the counter according to the time the fluid is to be delivered, and enabling means to selectively enable the counter to produce an output signal to actuate the valve shut-off mechanism when the counter has been incremented to the preset value of either the quantity presettable device or of the timer presettable device.

According to a still further feature, the sensor output means comprises a further digital counter between the sensor and the first-mentioned digital counter, said further counter being presettable to produce a single output pulse to the first-mentioned counter for each preset number of electrical signals from the sensor. This feature enables the control system to be calibrated at any time in a very convenient manner.

Another important advantage of the invention is that it conveniently permits other controls to be included. Described below are rate controls, for indicating the rate of water flow and for shutting off the water flow should the rate deviate from a preset rate. A totalizer counter may also be included, connected to the sensor, e.g. a reed switch, to totalize all the operations thereof.

Further features and advantages of the invention will be apparent from the description below.

BRIEF DESCRIPTION OF THE DRAWINGS

The invention is herein described, by way of example only, with reference to a preferred embodiment illustrated in the accompanying drawings, wherein.

DESCRIPTION OF THE PREFERRED EMBODIMENT

Figure 1:
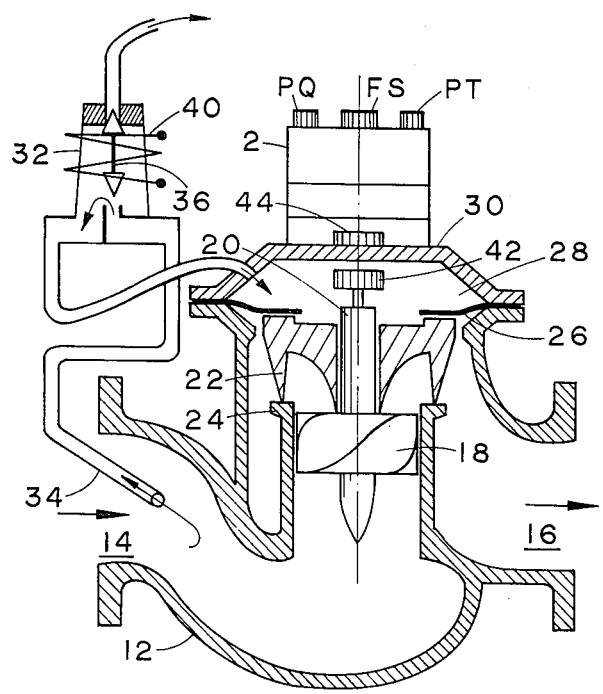
FIG. 1 is a transverse sectional view of one form of automatic metering valve constructed in accordance with the invention.

FIG. 1 illustrates an automatic metering valve constructed in accordance with the invention, the electronic control system being disposed mostly within a box 2 carried by the valve. The presetting devices for the control system are generally shown in FIG. 1 as including knobs PQ, PT and FS, these being more particularly shown in FIG. 2 as being a pair of knobs PQ1, PQ2 for presetting the quantity of water to be delivered, a pair of knobs PT1, PT2 for presetting a timer which determines when the valve is to be turned-on, and a function switch FS which determines the mode of operation of the control system.

The valve itself includes a housing, generally designated 12, having an inlet 14 and an outlet 16 for the water. The water passing from the inlet to the outlet rotates an impeller 18 mounted on a vertical shaft 20, and then passes through a controlled passageway, defined by a valve member 22 and a valve seat 24. Valve member 22 is carried by a diaphragm 26, which diaphragm defines a chamber 28 between it and wall 30 of the valve housing 12.

The pressure within diaphragm chamber 28 is determined by the position of a pilot valve 32 which controls the pressure applied to chamber 28 via an inlet pipe 34 in the valve inlet 14. In the illustrated position of pilot valve 32, wherein its displaceable valve member 36 is in the upper position, the inlet pressure is applied via pipe 34 to diaphragm chamber 28, forcing the diaphragm to move valve member 22 against valve seat 24 and thereby to close the main valve. When the pilot valve member 36 is in its lowered position, however, the inlet pressure is blocked from diaphragm chamber 28, so that the natural resilience of the diaphragm moves valve member 22 upwardly, out of engagement with valve seat 24, to thereby open the main valve and to permit the water to flow from inlet 14 to its outlet 16.

A solenoid 40, having two coils 40a, 40b (FIG. 2), controls the position of pilot valve member 36, and thereby the condition of the main valve.

According to the present invention, vertical shaft 20 of impeller 18 is provided with a cylindrical magnet 42 which magnet rotates within the valve housing 12 at the same velocity as impeller 18. Disposed externally of valve housing 12 is a sensor 44 which senses the rotation of magnet 42 and produces electrical signal in accordance with the speed of rotation of the magnet, and therefore of impeller 18. The control system within box 2 includes a presettable counter circuit effective to count the electrical signals and to actuate the pilot valve, by controlling the energization of its solenoid coil 40, to turn-off the main valve when the control system reaches a preselected count corresponding to the quantity of water to be delivered as preset by knobs PQ1, PQ2. The control system within box 2 further includes a presettable timer effective to actuate the pilot valve 32 to turn-on the main valve after the elapse of a predetermined time interval as preset by knobs PT1, PT2.

The presettable quantity knobs PQ1, PQ2, (FIG. 2) may be used to preset up to 99 units of water to be delivered, and the presettable timer knobs PT1, PT2 may be used to preset up to 99 units of time. Function switch FS may be used to preset the control system for single-shot operation or multiple-shot (repeat) operation. If also includes a pair of contacts which serve as the master switch MS (FIG. 2).

If it is desired to provide the control system with a larger or smaller capacity of presettable units of water and/or time, the appropriate number of knobs would be provided, one for each order of the respective quantity.

Figure 2:
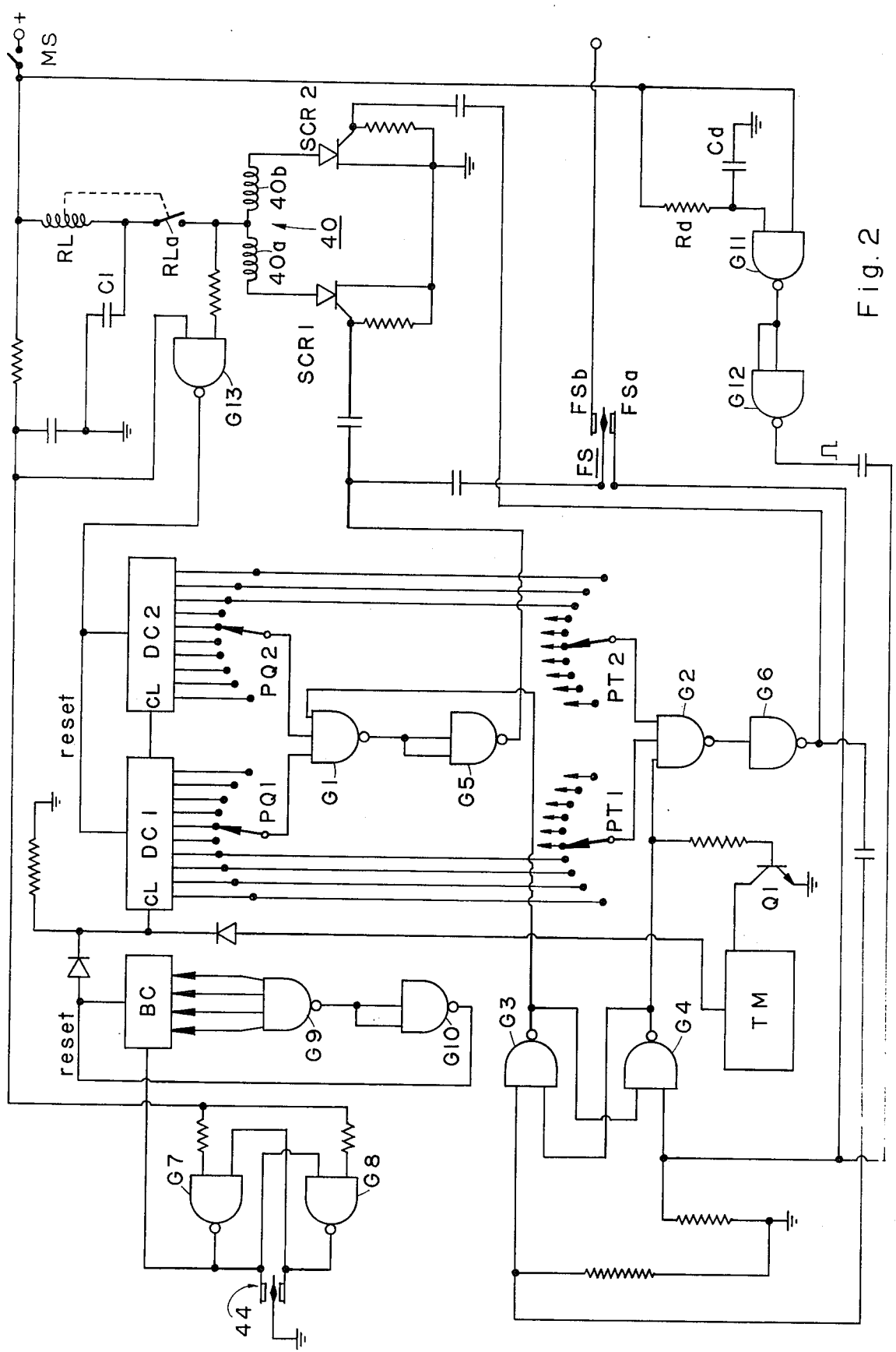
FIG. 2 is a schematic diagram of the electrical circuit in the control system of FIG. 1.

The foregoing presettable knobs PQ1, PQ2, PT1, PT2 are illustrated in the circuit diagram of FIG. 2. This circuit includes a two-order counter DC1, DC2, which is common to both the water-quantity presettable knobs PQ1, PQ2, and to the timer presettable knobs PT1, PT2. The presettable device which is effective to control the output from the counter, is determined by an enabling circuit including a coincidence gate G1 cooperable with the quantity presettable knobs PQ1, PQ2, and a second coincidence gate G2 which is cooperable with the timer presettable knobs PT1, PT2.

Gate G1 receives two inputs from the two orders of the decade counter DC1, DC2 in series with the water-quantity presettable knobs PQ1, PQ2, and a third "enabling" input from a flip-flop circuit including a pair of cross-connected NAND-gates G3, G4. Similarly, coincidence gate G2 receives two inputs from the two orders of the decade counter DC1, DC2 in series with the timer presettable knobs PT1, PT2, and a third "enabling" input from the other side of the flip-flop The output from gate G1 is inverted in gate G5 and is used to control a switching device in the form of a silicon-controlled rectifier SCR1 to energize coil 40a of the pilot valve 32 to close the main valve; and the output from coincidence gate G2 is inverted in gate G6 and is used to control a second silicon-controlled rectifier SCR2 which controls the energization of coil 40b of the pilot valve to open the main valve. The output from gates G2, G6 is also used to reset the flip-flop of gates G3, G4.

The circuit further includes a relay having a winding RL and a pair of contacts RLa in series with coil 40a or coil 40b of the pilot valve, depending upon which valve is energized by the firing of the respective silicon-controlled-rectifier SCR1, SCR2. Relay contacts RLa are normally closed when its winding RL is unenergized. A capacitor C1 is connected across relay winding RL so that the winding is in the charging circuit of the capacitor, with its contacts RLa in the capacitor discharging circuit. Under normal conditions, capacitor C1 is fully charged, so that relay winding RL draws little current; its contacts R1 therefore are normally closed. However, whenever one of the rectifiers SCR1 or SCR2 is fired, capacitor C1 discharges through the winding of the pilot valve whose rectifier was energized, thereby causing the pilot valve to open or close, as the case may be, to control the main valve in the manner described above. The discharge of capacitor C1 causes relay winding RL to draw current, which causes its contacts RLa to open, thereby interrupting the conduction of the fired SCR.

Sensor 44 (FIG. 1) which senses the rotation of magnet 42 by the impeller 20 and produces electrical signals in accordance with the speed of rotation of the impeller, is illustrated in FIG. 2 as in the form of a reed switch 44 having a contact movable to engage and disengage a pair of fixed contacts with each rotation of the impeller. The electrical signals produced by reed switch 44 are fed via a latching circuit including cross-connected NAND-gates G7, G8 to a binary counter BC, and the output of the binary counter is fed to the decade counter DC1, DC2.

The purpose of the latching circuit including gates G7, G8, is to reduce the effects of contact bounce in the reed switch. The purpose of binary counter BC is to enable the system to be calibrated so as to produce a single pulse for each predetermined number of rotations of impeller. Binary counter BC is illustrated as a 4-stage counter and is presettable by connecting its various stages to the input of another coincidence gate G9 to produce, via inverter gate G10, a single output for the preset number of input signals from the reed switch 44. This output resets the binary counter and also feeds a single pulse to the decade counter DC1, DC2.

The control circuit further includes a timer TM which produces one pulse per unit time, example one pulse per hour, which pulses are also fed to decade counter DC1, DC2. Timer TM is controlled by a transistor Q1, which is in turn controlled by the enabling circuit including gates G3, G4. The latter gates constitute a bistable flip-flop which is actuated to one of its stages (e.g. the "set" state) by a starting signal fed (via gates G11, G12) when the control circuit is at first turned-on, and is actuated to its second state (e.g. the "reset" state) when the time preset by knobs PT1, PT2 has elapsed as manifested by an output signal from gates G2 and G6 as described above.

One input of gate G11 is connected to the line via master switch MS, and via a delay circuit including resistor Rd and a capacitor Cd. The second input of gate G11 is connected directly to the line via master switch MS, so that as soon as switch MS is closed, a negative pulse is outputted by gate G11, which pulse is inverted by gate G12.

The control system of FIG. 3 operates as follows:

The timer knobs PT1, PT2 are first preset for the time at which the water is to be delivered, and the quantity knobs PQ1, PQ2 are preset for the quantity of water to be delivered. The system is then preset for Single-Shot or Repeat operation by means of the function switch FS, movable contact of the latter switch engaging contact FSa for repeat operation and contact FSb for single-shot operation. The master switch MS is closed with the above setting of the function switch FS.

As soon as the master switch is closed, gate G11, via its time delayed input including resistor Rd and capacitor Cd, produces a negative pulse which is inverted by gate G12 and is fed to the bistable flip-flop circuit including gates G3, G4. The latter circuit applies a positive bias to gate G2 enabling that gate, and also a positive bias to transistor Q1 turning-on timer TM. The latter timer outputs a single pulse per predetermined time interval, for example each hour, this pulse being fed to the decade counter DC1, DC2.

As soon as the counter has been incremented according to the time preset by knobs PT1, PT2, gate G2 receives positive pulses from its other two inputs, and produces an output via inverter gate G6 to the silicon-controlled rectifier SCR2, firing same, whereupon C1 discharges energizing winding 40b of the pilot valve to open the main valve as described above.

The output signal from gates G2, G6 is also supplied to gate G3 of the enabling latching circuit, resetting the flip-flop and thereby removing the positive bias applied to gate G2 and to timer TM. The flip-flop then applies a positive "enabling" bias to gate G1 in the circuit of the presettable quantity knobs PQ1, PQ2.

With the main valve open, the water is delivered from its inlet 14 to its outlet 16, and rotates impeller 18 at a rate corresponding to the rate of delivery of the water. As impeller 18 rotates, magnet 42 rotating therewith actuates reed switch 44 which produces electrical pulses supplied via the latching circuit of gates G7 and G8 to binary counter BC. As indicated earlier, latching circuit G7, G8 minimizes the effects of contact bounce; and binary counter BC may be preset, by the connections to gate G9, to produce one output pulse for each predetermined number of input pulses. The output pulses are supplied to decade counter DC1, DC2, incrementing the counter in the same manner as it is incremented by the pulses from timer TM.

Decade counter DC1, DC2, is cleared by the first pulse from the binary counter BC, or from the timer TM, so that its contents are at zero at the start of a time-measuring operation.

Decade counter DC1, DC2 is thus incremented according to the number of revolutions of impeller 18 of the main valve, this number of revolutions representing the instantaneous quantity of water delivered. As soon as the decade counter measures a quantity of water equal to that preset by knobs PQ1, PQ2, gate G1 produces an output which is inverted by gate G5 and supplied to silicon-controlled-rectifier SCR1 to fire same and thereby to energize coil 40a of the pilot valve 32, closing the main valve.

Whenever either rectifier SCR1 or SCR2 is fired, the decade counter DC1, DC2 is reset by a pulse from gate 413.

If the circuit has been set for repeat mode (function switch FS engaging contact FSa), as soon as the quantity measuring operation has been completed the output from gates G5 and G1 also toggles the enabling latching circuit of gates G3 and G4 thereby removing the enabling bias on gate G1, and placing an enabling bias on the timer circuit including gate G2 and transistor Q1 which again starts the timer TM to operate as described above. Thus, the cycle will be repeated, the pilot being actuated to open the main valve after a predetermined interval has elapsed and then being operated to close the main valve after a predetermined quantity of water has been delivered. On the other hand, if function switch FS is set for Single-Shot mode (engaging contact FSb), the system will go through Single-Shot operation described above, since the latching circuit of gate G3, G4 will not re-enable the timer gate G2 or restart the timer TM.

Figure 3:
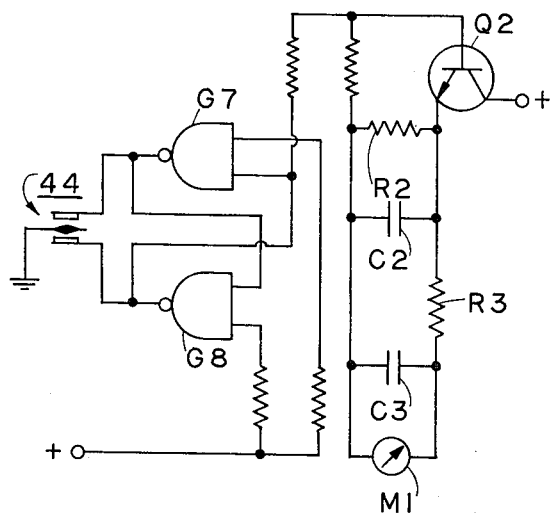
FIG. 3 illustrates a variation in the circuit of FIG. 2 for providing an indication of the rate of water flow.

FIG. 3 illustrates a variation enabling the control system to also provide an indication of the rate of water flow. For this purpose, the output of flip-flop gates G7, G8 is connected to an integrating circuit indicating the rate of flow. The latter integrating circuit includes a transistor Q2 receiving the pulses from the reed-switch sensor 44 via the latching circuit of gates G7, G8, these pulses being fed to the base of transistor Q2. The pulses are integrated in the circuit including resistors R2, R3 and capacitors C2, C3, and the pulse rate is indicated by a meter M1 preferably calibrated to show rate of flow.

Figure 4:
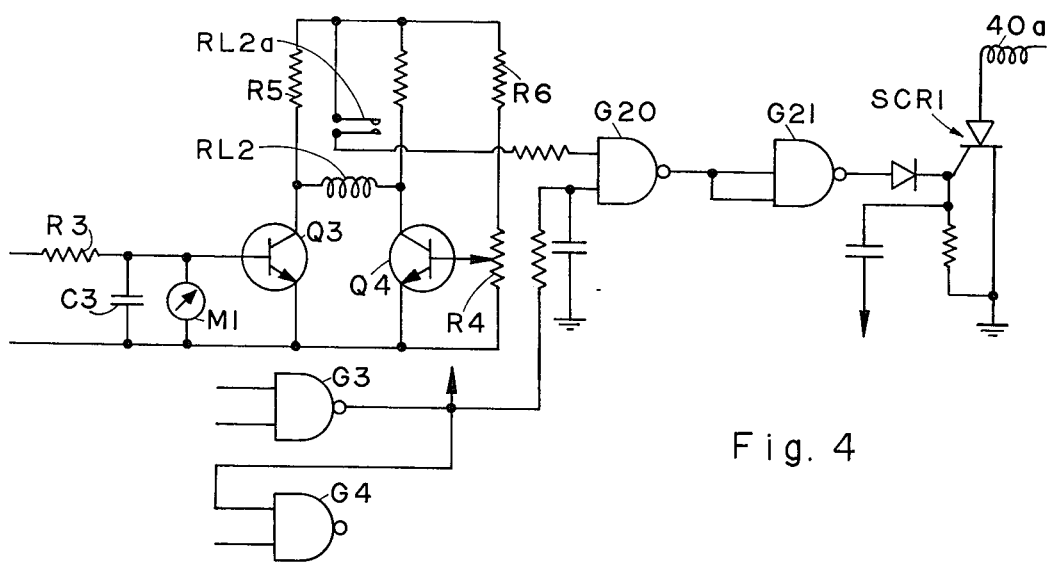
FIG. 4 illustrates a further variation in the circuit of FIG. 2 for controlling the water supply should the actual rate-of-delivery deviate from the preset rate.

FIG. 4 illustrates an additional control that may be included in the circuit of FIG. 2 for controlling the valve shut-off mechanism to turn-off the valve should the sensed rate of water flow deviate substantially from a preset rate. The control system could thus be used for automatically turning off the valve should the rate of water flow be too high as might arise from a broken pipe downstream from the valve, or should it be too low as might arise because of a drop in the water supply pressure.

For providing this control, the output of the intergrating circuit in FIG. 3 is fed to a bridge circuit including a pair of transistors Q3, Q4 and resistors R4–R8. A relay winding RL2 is connected across the output of the bridge circuit and thus senses any unbalance therein. The bridge is balanced by varying resistor R4, which determines the desired rate of water flow, and if the rate of flow deviates in either direction from the present rate, relay winding RL2 draws sufficient current to close its contacts RL2a.

When contacts RL2a are closed, a positive voltage is applied to one input of gate G20, the other input being connected to gate G3 so as to enable gate G20 when the flip-flop of gates G3, G4 is in the water-measuring condition. The output of gate G20 is inverted and is re-inverted by gate G21 before being applied to the control electrode of the switching rectifier SCR1, which energizes pilot valve coil 40a to close the valve.

Figure 5:
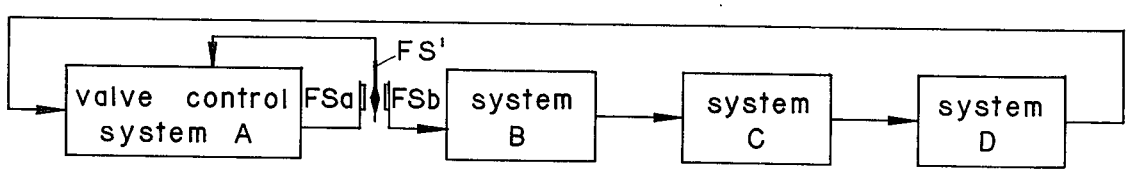
FIG. 5 is a block diagram illustrating how a plurality of control systems may be arranged to be operated in sequence.

FIG. 5 illustrates how a plurality of systems of FIG. 2 may be connected in sequence such that when the systems are conditioned for Single-Shot operation, the completion of the operation of one system automatically enables the operation of the next system in the sequence.

As described earlier, when function switch FS is in the position wherein its movable contact engages fixed contact FSb, it is conditioned for Single-Shot operation. In this condition, as soon as one system (System A) completes its operation to deliver a predetermined quantity of water, it automatically enables the next system in the sequence (System B) for operation. The system in operation will deliver its present quantity starting with a preset time if the timer control is also included. The completion of the operation of system B will enable system C, and so on to the last system (System D). The last system enables the first system in the sequence (System A), thereby providing a continuous and repeating sequential operation of all the systems.

While the invention has been described with respect to a preferred embodiment, including specific metering valve, it will be appreciated that it could be used with other valves, for example those including horizontal impellers rather than the illustrated vertical impellers. Also, other sensors, e.g. hall-effect detectors, could be used instead of the reed switch 44 and magnet 42. Further, a totalizer counter could be included connected to count the operations of reed switch 44, the totalizer being preferably connected to the output of the binary counter BC to count the batches. In addition, the electronic control may be incorporated in a control box and simply attached to known commercial valves. Many other variations, modifications and applications of the invention will also be apparent.

What is claimed is:

1. An electrical control system for an automatic metering valve delivering a preset quantity of a fluid and including a housing for the valve; a rotary impeller disposed within the housing and rotatable at a velocity in accordance with the rate of delivery of the fluid; and an automatic shut-off mechanism for turning-off the valve when the preset quantity of fluid has been delivered; said control system including a sensible element disposed internally of the valve housing and rotated with the impeller, a sensor sensing the sensible element to produce electrical signals corresponding to the number of rotations thereof and of the impeller, a presettable counter circuit effective to count said electrical signals, a switching circuit effective to actuate the valve shut-off mechanism to turn-off the valve when the counter circuit reaches a preset number corresponding to the preset quantity of fluid to be delivered, and a presettable timer effective to actuate the valve shut-off mechanism to turn-on the valve after the elapse of a preset time interval, said presettable counter circuit including a digital counter, a sensor output circuit for incrementing the digital counter by said sensor electrical signals, a timer producing timing electrical signals, a timer output circuit for incrementing the digital counter by said timer electrical signals, a quantity presettable device for presetting the counter according to the predetermined quantity of fluid to be delivered, a timer presettable device for presetting the counter according to the time the fluid is to be delivered, and enabling means to selectively enable the counter to produce an output signal to actuate the valve shut-off mechanism when the counter has been incremented to the present value of either the quantity presettable device or of the timer presettable device.

2. A control system according to claim 1, wherein said enabling means comprises a bistable device having a first state enabling the counter to produce a first output signal when it has been incremented to the preset value of the quantity presettable device, and a second state enabling the counter to produce a second output signal when it has been incremented to the preset value of the timer presettable device.

3. A control system according to claim 2, wherein said switching circuit including means effective to actuate the valve shut-off mechanism to turn-on the valve in response to said second output signal and to actuate the valve shut-off mechanism to turn-off the valve in response to said first output signal.

4. A control system according to claim 2, wherein said enabling means comprises: a first coincidence gate having an input from each of the orders of the quantity presettable device and a first enabling input from the bistable device, a second coincidence gate having an input from each of the orders of the timer presettable device and a second enabling input from the bistable device, and a timer switching device connected to receive said second enabling input from the bistable device to start the timer.

5. A control system according to claim 4, further including means for conditioning the timer either for single-shot operation to turn-on the valve after the elapse of the predetermined time interval and to turn-off the valve after it has delivered the predetermined quantity of water, or for repeat operation to continuously repeat the above sequence of events.

6. The combination of a plurality of control systems each according to claim 5 arranged in sequence, each system being connected to the next in the sequence such that when the system are conditioned for single-shot operation, the completion of the operation of one system automatically enables the operation of the next system in the sequence.

7. A control system according to claim 1, wherein said sensor output means comprises a further digital counter between the sensor and the first-mentioned digital counter, said further counter being presettable to produce a single output pulse to the first-mentioned counter for each preset number of electrical signals from the sensor.

8. A control system according to claim 1, wherein said presettable counter-circuit further includes an intergrator having an indicator for indicating the rate of fluid flow.

9. A control system according to claim 1, wherein said presettable counter-circuit further includes a rate-sensing circuit having a presettable rate and means for controlling the switching circuit to actuate the valve shut-off mechanism to turn-off the valve should the sensed rate deviate from the preset rate.

10. A control system according to claim 1, wherein said automatic shut-off mechanism includes a pilot valve actuated to one position by said electrical control system to turn-on the valve, and actuated to a second position by said electrical control system to turn-off the valve.

11. A control system for an automatic metering valve delivering a preset quantity of a fluid and including a housing for the valve; a rotary impeller disposed within the housing and rotatable at a velocity in accordance with the rate of delivery of the fluid; and an automatic shut-off mechanism for turning-off the valve when the present quantity of fluid has been delivered; said control system including sensible element disposed internally of the valve housing and rotated with the impeller, a sensor sensing element to produce electrical signals corresponding to the number of rotations thereof and of the impeller, a presettable counter circuit effective to count said electrical signals, and a switching circuit effective to actuate the valve shut-off mechanism to turn-off the valve when the counter circuit reaches a preset number corresponding to the present quantity of fluid to be delivered; said switching circuit including: a capacitor having a charging circuit and a discharging circuit; a switching device in the capacitor discharging circuit and have a control electrode effective to fire the switching device and thereby to cause the capacitor to discharge; and a relay having a winding in the capacitor charging circuit and a pair of contacts in the capacitor discharging circuit, and contacts being normally closed when the capacitor is charged and the relay coil draws little current, and being automatically opened to interrupt the connection to the switching device when the capacitor has discharged causing the relay winding to draw a larger amount of current for recharging the capacitor.

* * * * *